US010870387B1

(12) United States Patent
López Maldonado

(10) Patent No.: US 10,870,387 B1
(45) Date of Patent: Dec. 22, 2020

(54) LIGHTING UNITS FOR VEHICLES

(71) Applicant: Nissan North America, Inc., Franklin, TN (US)

(72) Inventor: Mariano López Maldonado, Aguascalientes (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/588,110

(22) Filed: Sep. 30, 2019

(51) Int. Cl.
  *B60Q 1/20* (2006.01)
  *B60Q 1/26* (2006.01)
  *B60R 19/02* (2006.01)
  *F21S 43/19* (2018.01)
  *F21W 103/00* (2018.01)

(52) U.S. Cl.
  CPC ............ *B60Q 1/2623* (2013.01); *B60Q 1/20* (2013.01); *B60R 19/02* (2013.01); *F21S 43/19* (2018.01); *F21W 2103/00* (2018.01)

(58) Field of Classification Search
  CPC .... B60Q 1/2623; B60Q 1/2619; B60Q 1/263; B60Q 1/2634; B60Q 1/20; B60R 19/02; F21S 43/19
  See application file for complete search history.

(56) References Cited

U.S. PATENT DOCUMENTS

| | | | |
|---|---|---|---|
| 3,375,367 A * | 3/1968 | Woodcock | F21S 45/10 362/390 |
| 3,998,178 A | 12/1976 | Dutot et al. | |
| 4,488,206 A * | 12/1984 | Mizusawa | B60Q 1/0441 24/289 |
| 4,532,578 A * | 7/1985 | Gaden | B60Q 1/2607 362/365 |
| 4,722,032 A * | 1/1988 | Kulka | B60Q 1/0425 362/287 |
| 6,361,197 B1 | 3/2002 | Katsumata et al. | |
| 6,502,975 B1 * | 1/2003 | Branstetter | F21S 48/215 362/366 |
| 7,275,848 B2 * | 10/2007 | Chinniah | F21V 29/71 362/547 |
| 7,427,152 B2 * | 9/2008 | Erion | F21V 29/677 362/547 |
| 8,109,546 B2 * | 2/2012 | Schelberg | B60Q 1/30 293/117 |
| 9,896,024 B1 * | 2/2018 | Smith | B60Q 1/263 |
| 2014/0293637 A1 * | 10/2014 | Datz | B60Q 1/2653 362/521 |

FOREIGN PATENT DOCUMENTS

| | | |
|---|---|---|
| CN | 202782870 U | 3/2013 |
| JP | 2000085453 A | 3/2000 |

* cited by examiner

*Primary Examiner* — Julie A Bannan
(74) *Attorney, Agent, or Firm* — Young Basile Hanlon & MacFarlane, P.C.

(57) ABSTRACT

A lighting unit for a vehicle is disclosed that includes a housing; a radial flange that extends outwardly of the housing; and at least one retainer that is fixedly connected to the radial flange such that the at least one retainer extends rearwardly towards a body of the vehicle during installation to allow for removable connection of the lighting unit to the body of the vehicle from a location forward of the vehicle. The at least one retainer is configured for insertion into a corresponding opening in the body of the vehicle and includes a resilient material that facilitates deflection of the at least one retainer during installation and removal of the lighting unit.

20 Claims, 3 Drawing Sheets

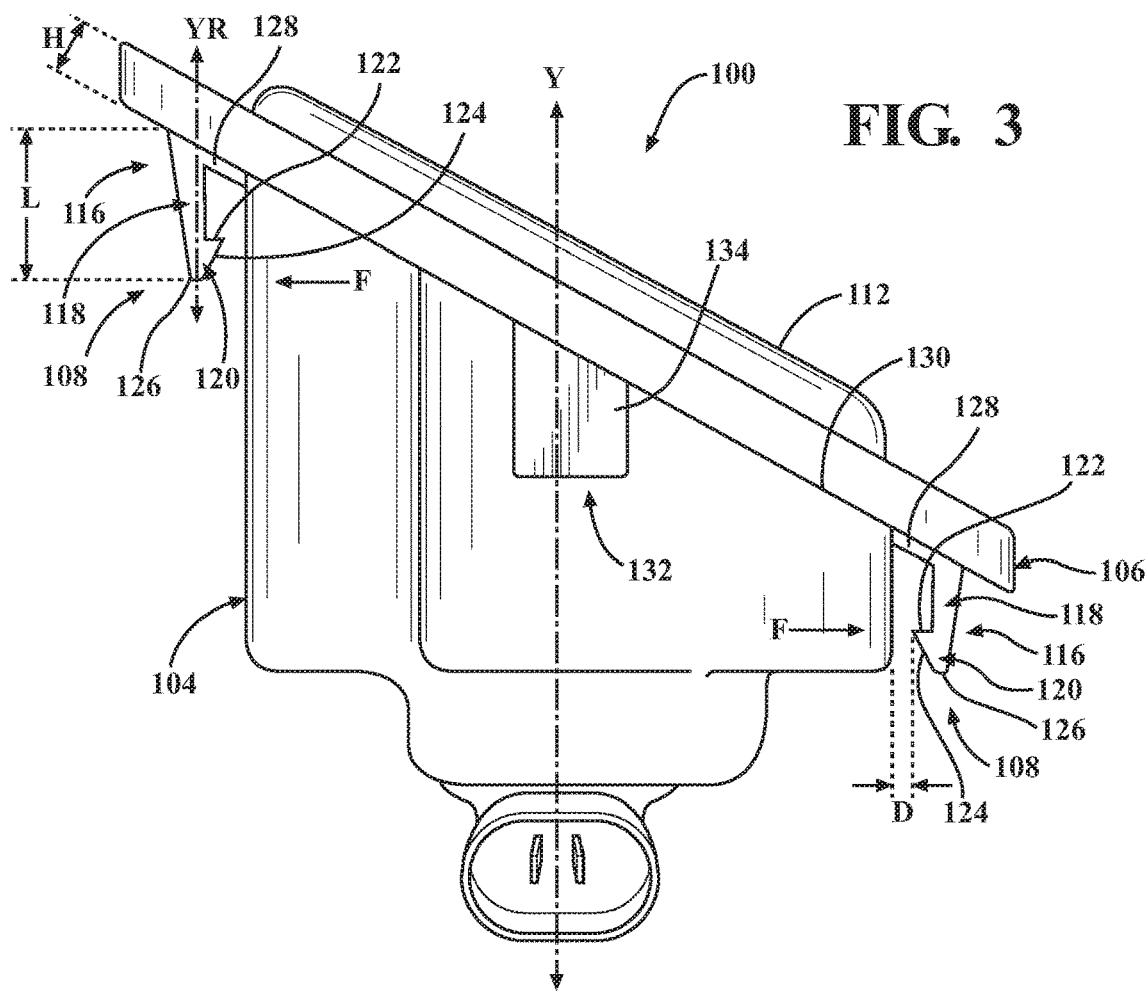
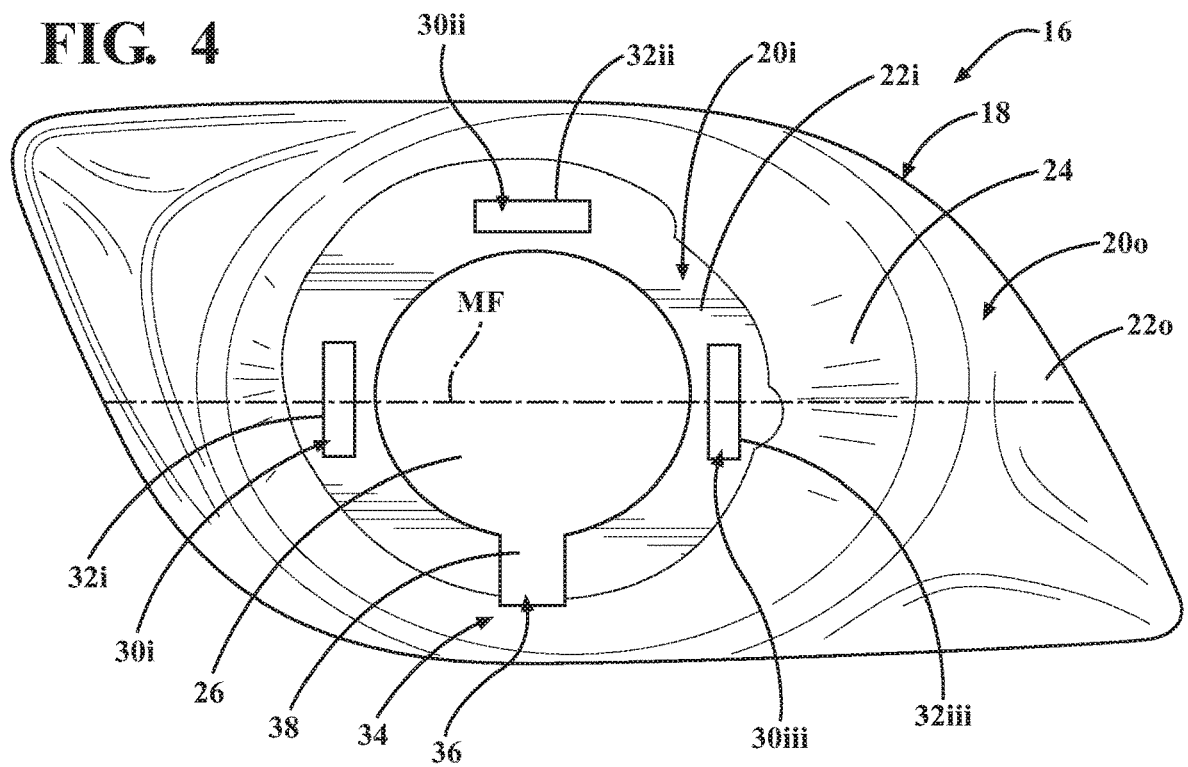

LIGHTING UNITS FOR VEHICLES

TECHNICAL FIELD

The present disclosure relates to lighting units for vehicles, and, more specifically, to lighting units that are configured for removable connection from a location forward of a vehicle.

BACKGROUND

Known lighting units (e.g., fog lamps, headlights, signal units, etc.) are often connected to vehicles via one or more bolts, screws, or the like and typically require installation from either underneath the vehicle or from a location behind the bumper, facia, etc. Additionally, the configuration of known lighting units often results in the creation of an undesirable "see-through" condition, in which light is visible through gapping between the lighting unit and the body of the vehicle, potentially allowing for the pavement (road) to be seen, as well as components within the engine compartment, etc.

To address these issues, the present disclosure describes a lighting unit that eliminates the "see-through" condition and is configured for connection and disconnection from a location forward of the vehicle (e.g., from the front of the vehicle, rather than from beneath the vehicle or from behind the bumper, facia, etc.), thus simplifying installation and removal of the lighting unit, improving installation quality and efficiency, and reducing the overall cost associated with vehicle assembly and/or service.

SUMMARY

In one aspect of the present disclosure, a lighting unit for a vehicle is disclosed that includes a housing; a radial flange that extends outwardly of the housing; and at least one retainer that is fixedly connected to the radial flange such that the at least one retainer extends rearwardly towards a body of the vehicle during installation to allow for removable connection of the lighting unit to the body of the vehicle from a location forward of the vehicle. The at least one retainer is configured for insertion into a corresponding opening in the body of the vehicle and includes a resilient material that facilitates deflection of the at least one retainer during installation and removal of the lighting unit.

In certain embodiments, the housing, the radial flange, and the at least one retainer may be integrally formed.

In certain embodiments, the at least one retainer may be configured as a clip.

In certain embodiments, the at least one retainer may be repositionable between a normal position, in which the at least one retainer is spaced a first distance from the housing, and a biased position, in which the at least one retainer is spaced a second distance from the housing.

In various embodiments, it is envisioned that the at least one retainer may be configured such that the second distance is greater than the first distance or less than the first distance.

In certain embodiments, the at least one retainer may include a plurality of retainers.

In certain embodiments, the plurality of retainers may be identical in configuration.

In certain embodiments, the plurality of retainers may include a first retainer, a second retainer, and a third retainer.

In certain embodiments, the second retainer may be separated from the first retainer by approximately 90°, and the third retainer may be separated from the second retainer by approximately 90°.

In certain embodiments, the lighting unit may further include an alignment feature that is configured for insertion into a corresponding receptacle on the body of the vehicle.

In certain embodiments, the alignment feature may include a configuration that is different from those of the retainers to inhibit improper installation of the lighting unit.

In certain embodiments, the alignment feature may be separated from each of the first retainer and the third retainer by approximately 90°.

In another aspect of the present disclosure, a vehicle is disclosed that includes a body and a lighting unit. The body includes a finisher defining a receiving space and including at least one opening, and the lighting unit is configured for removable insertion into the receiving space. The lighting unit includes a housing; a radial flange that extends outwardly from the housing; and at least one retainer that is fixedly connected to the radial flange. The at least one retainer is configured to facilitate removable connection of the lighting unit to the finisher from a location forward of the vehicle. The at least one retainer is also configured for insertion into the at least one opening in the finisher and is resiliently deflectable between an initial position and a deflected position during installation and removal of the lighting unit.

In certain embodiments, the at least one retainer may be configured for engagement with the finisher such that a channel is defined between the lighting unit and the finisher upon installation of the lighting unit to facilitate air flow about the lighting unit.

In certain embodiments, the finisher may include an extension that extends in generally parallel relation to the radial flange such that the extension is positioned rearwardly of the radial flange.

In certain embodiments, the channel may extend between the finisher and the radial flange.

In certain embodiments, the finisher and the radial flange may be configured to prevent contact between the finisher and the housing of the lighting unit.

In certain embodiments, the finisher may further include a receptacle that is configured to receive an alignment feature on the lighting unit.

In certain embodiments, the alignment feature may include a configuration that is different from that of the at least one retainer to inhibit improper installation of the lighting unit.

In another aspect of the present disclosure, a method of connecting a lighting unit to a vehicle is disclosed that includes positioning the lighting unit, from a location forward of the vehicle, such that a retainer extending fixedly and rearwardly from a radial flange of the lighting unit is generally aligned with a corresponding opening in a body of the vehicle, and inserting the retainer into the corresponding opening in the body of the vehicle such that the retainer is resiliently deflected from an initial position to a deflected position to removably secure the lighting unit to the body of the vehicle.

In certain embodiments, inserting the retainer into the corresponding opening in the body of the vehicle may include defining a channel between the lighting unit and the body of the vehicle to facilitate air flow about the lighting unit.

In certain embodiments, inserting the retainer into the corresponding opening in the body of the vehicle may include inserting a first retainer into a first opening in the body of the vehicle, inserting a second retainer into a second opening in the body of the vehicle, and inserting a third retainer into a third opening in the body of the vehicle.

In certain embodiments, the second retainer may be separated from the first retainer by approximately 90°, and the third retainer may be separated from the second retainer by approximately 90°.

BRIEF DESCRIPTION OF THE DRAWINGS

According to common practice, the various features of the drawings may not be to scale, and may be arbitrarily expanded or reduced for clarity.

FIG. 3 is a side, plan view of one of the lighting units shown separated from the vehicle.

FIG. 4 is a front, plan view illustrating a portion of the body of the vehicle configured to support one of the lighting units.

DETAILED DESCRIPTION

The present disclosure describes various embodiments of lighting units (e.g., fog lamps, headlights, signal units, etc.) for vehicles. The lighting units described herein include one or more retainers (e.g., spring clips) that replace the bolts (or other such fasteners) that are conventionally used in such installations. The lighting units described herein are configured for connection and disconnection from a location forward of the vehicle (e.g., from the front of the vehicle, rather than from beneath the vehicle or from behind the bumper, facia, etc.), which further simplifies installation and removal of the lighting unit, improves installation quality and efficiency, and reduces the overall cost associated with vehicle assembly and/or service.

The lighting units described herein also include a radial flange that overlaps structure on the body of the vehicle to reduce (if not entirely eliminate) the "see-through" condition that is common to known lighting units.

Figure 1:
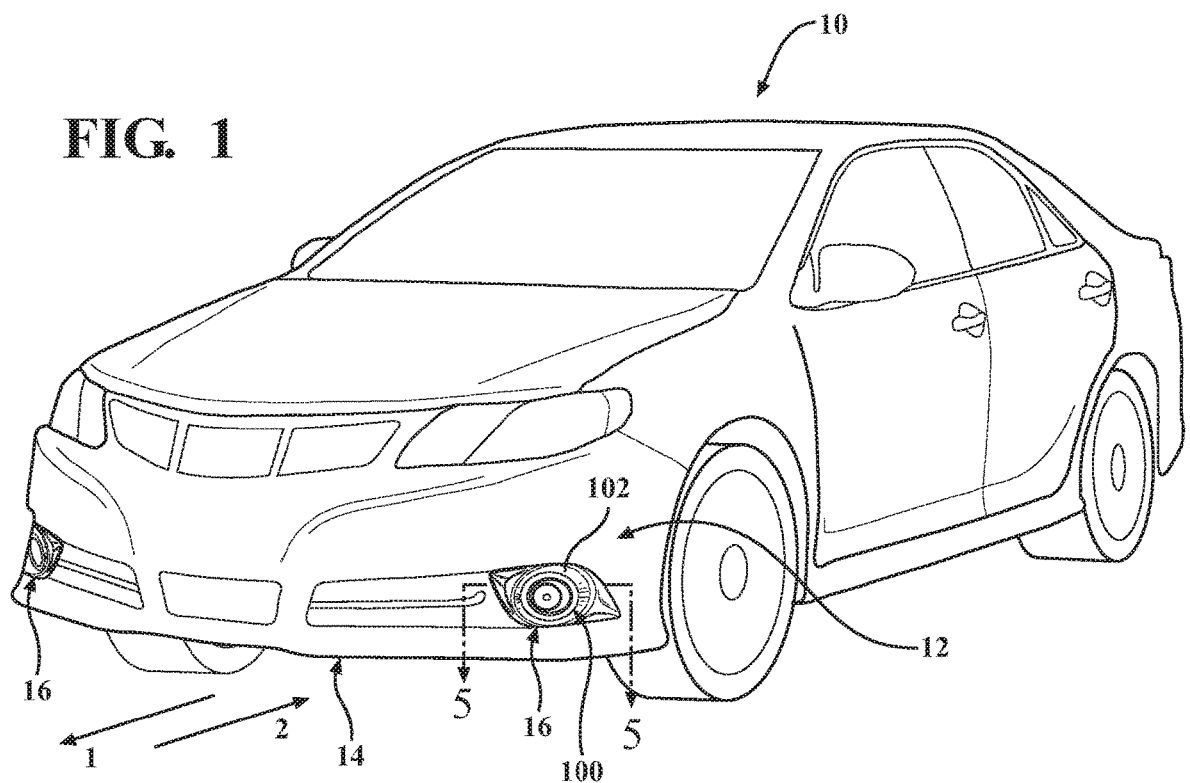
FIG. 1 is a front, perspective view of a vehicle including a plurality of lighting units in accordance with the principles of the present disclosure.

With reference to FIG. 1, a vehicle 10 is illustrated, which includes a series of lighting units 100 according to the principles of the present disclosure. Although generally illustrated and described herein as a fog lamp 102, it should be appreciated that the specific configuration and location of the lighting unit 100 may be varied in alternate embodiments without departing from the scope of the present disclosure, and that the principles of the present disclosure may find wide applicability to a broad range of lighting units (e.g., headlights, signal units, etc.). Additionally, while a single lighting unit 100 is shown throughout the figures and described below, it should be understood that the vehicle 10 may include one or more additional lighting units 100 (e.g., on opposite sides or ends of the vehicle 10).

Referring to FIGS. 2-5 as well, the lighting unit 100 is configured for removable connection to a body 12 of the vehicle 10, and includes a housing 104; a flange 106 that extends radially outward of the housing 104; and one or more retainers 108 (e.g., clips 110). As detailed below, to create added flexibility in the installation of the lighting unit 100, the lighting unit 100 may be either directly connected to the body 12 of the vehicle 10 (e.g., to the vehicle's bumper 14, facia, etc.), or indirectly connected to the body 12 of the vehicle 10, such as via a finisher 16 that is included on (e.g., supported by) the body 12 (e.g., by the bumper 14), as seen in FIGS. 1 and 4.

The housing 104 of the lighting unit 100 may include (e.g., may be formed partially or entirely from) any suitable material or combination of materials and may be formed using any suitable method of manufacture. For example, it is envisioned that the housing 104 may include one or more plastic materials, one or more polymeric materials, one or more metallic materials, carbon fiber, etc. As seen in FIG. 4, the housing 104 supports a lens 112 and is configured to receive (or otherwise accommodate) one or more light sources 114, such as, for example, one or more halogen bulbs, LED bulbs, etc.

The flange 106 extends radially outward of the housing 104 (e.g., in transverse relation to a longitudinal axis Y (FIG. 3) of the housing 104) so as to define a radial dimension R. For example, in the particular embodiment shown throughout the figures, it is envisioned that the radial dimension R may lie substantially within the range of approximately 1 cm to approximately 3 cm. It should be appreciated, however, that dimensions outside this range would not be beyond the scope of the present disclosure, depending, for example, upon the particular style of the vehicle 10, the size of the lighting unit 100, etc. Although the flange 106 is illustrated as being integrally formed with the housing 104 in the particular embodiment of the disclosure shown throughout the figures, it is also envisioned that the flange 106 may be formed as a separate, discrete component that may be secured to the lighting unit 100 (e.g., to the housing 104, to the lens 112, etc.) in any suitable manner (e.g., via adhesive, welding, etc.).

In the particular embodiment shown throughout the figures, the flange 106 includes a generally planar, annular (e.g., circular) configuration, thereby attributing a generally mushroom-shaped configuration to the lighting unit 100. It should be appreciated, however, that the particular configuration of the flange 106 may be varied in alternate embodiments of the disclosure. For example, embodiments in which the flange 106 may be elliptical or polygonal (e.g., rectangular, square, etc.) are also contemplated herein, as are embodiments in which the flange 106 may be non-planar in configuration. For example, embodiments in which the flange 106 defines a variable vertical dimension (e.g., height H (FIG. 3)) would also be within the scope of the present disclosure.

In various embodiments of the disclosure, it is envisioned that the flange 106 may be formed from either the same material as the housing 104 or the lens 112, or from one or more different materials. Additionally, it is envisioned that the material(s) used in construction of the flange 106 may be either opaque or non-opaque (e.g., translucent or transparent). For example, it is envisioned that the flange 106 may include (e.g., may be formed partially or entirely from) one or more of plastic, glass, polycarbonate, etc.

In various embodiments of the lighting unit 100, it is envisioned that the flange 106 may be configured so as to extend radially outward of the lens 112, as seen in FIG. 3, for example. Alternatively, it is envisioned that the lens 112 may extend radially outwardly of the flange 106 such that the flange 106 is partially (or entirely) covered by the lens 112.

With continued reference to FIGS. 1-5, the retainer(s) 108 will be discussed. The retainer(s) 108 extend rearwardly (i.e., towards the body 12 of the vehicle 10) and are configured for engagement with a corresponding structure on the body 12 of the vehicle 10 to removably secure the lighting unit 100 to the vehicle 10. The retainer(s) 108 replace the bolts (or other such fasteners) that are conventionally utilized to connect lighting units to vehicles and, in the particular embodiment of the disclosure shown throughout the figures, are configured as spring clip(s) 116. The retainer(s) 108 are resiliently repositionable (e.g., deflectable) between a normal (initial, unbiased) position and a biased (subsequent, deflected) position upon the application and removal of an external force, such as that which is applied to the retainer(s) 108 by the body 12 of the vehicle 10 during installation and removal of the lighting unit 100. To facilitate repositioning of the retainer(s) 108, it is envisioned that the retainer(s) 108 may include (e.g., may be formed partially or entirely from) any suitable material or combination of materials, such as, for example, one or more plastic materials, one or more polymeric materials, one or more metallic materials, carbon fiber, etc.

In the particular embodiment of the disclosure described hereinbelow and shown throughout the figures, each retainer 108 includes an arm 118 and a finger 120, and defines an overall length L that is dimensioned to facilitate secured connection of the lighting unit 100 to the body 12 of the vehicle 10 so as to inhibit (if not entirely prevent) relative movement therebetween (e.g., rattling). It should be appreciated, however, that the particular configuration of the retainer(s) 108 may be varied in alternate embodiments without departing from the scope of the present disclosure (e.g., based upon the configuration of the housing 104, the body 12 of the vehicle 10, the style of the vehicle 10, etc.).

The arm 118 of each retainer 108 defines an axis YR that extends in generally parallel relation to the longitudinal axis Y of the housing 104, and the finger 120 of each clip extends transversely (e.g., generally orthogonally) from the arm 118 so as to define a shoulder 122 that is configured for engagement (contact) with the body 12 of the vehicle 10, as described in further detail below. Although shown as extending inwardly from the arm 118 (i.e., towards the housing 104 of the lighting unit 100) in the illustrated embodiment, in alternate embodiments of the disclosure, it is envisioned that the finger 120 may instead extend outwardly from the arm 118 (i.e., away from the housing 104). To facilitate deflection of the retainer(s) 108 during installation and removal, as seen in FIG. 3, for example, the finger 120 defines a bearing wall 124 that extends at an angle to the axis YR such that the finger 120 includes a generally tapered configuration with a transverse cross-sectional dimension (e.g., a width) that decreases from the shoulder 122 towards a terminal end 126 of the finger 120 (and increases towards the lens 112).

In certain embodiments, such as that seen throughout the figures, it is envisioned that each retainer 108 may further include a base portion 128 to facilitate connection of the retainer(s) 108 to the lighting unit 100. As seen in FIG. 3, for example, in such embodiments, the arm 118 extends from the base portion 128 such that the base portion 128 is positioned between the flange 106 and the arm 118. It should be appreciated, however, that the base portion 128 may be omitted from the retainer(s) 108, and that the arm 118 may extend directly from the flange 106 without departing from the scope of the present disclosure.

Figure 2:
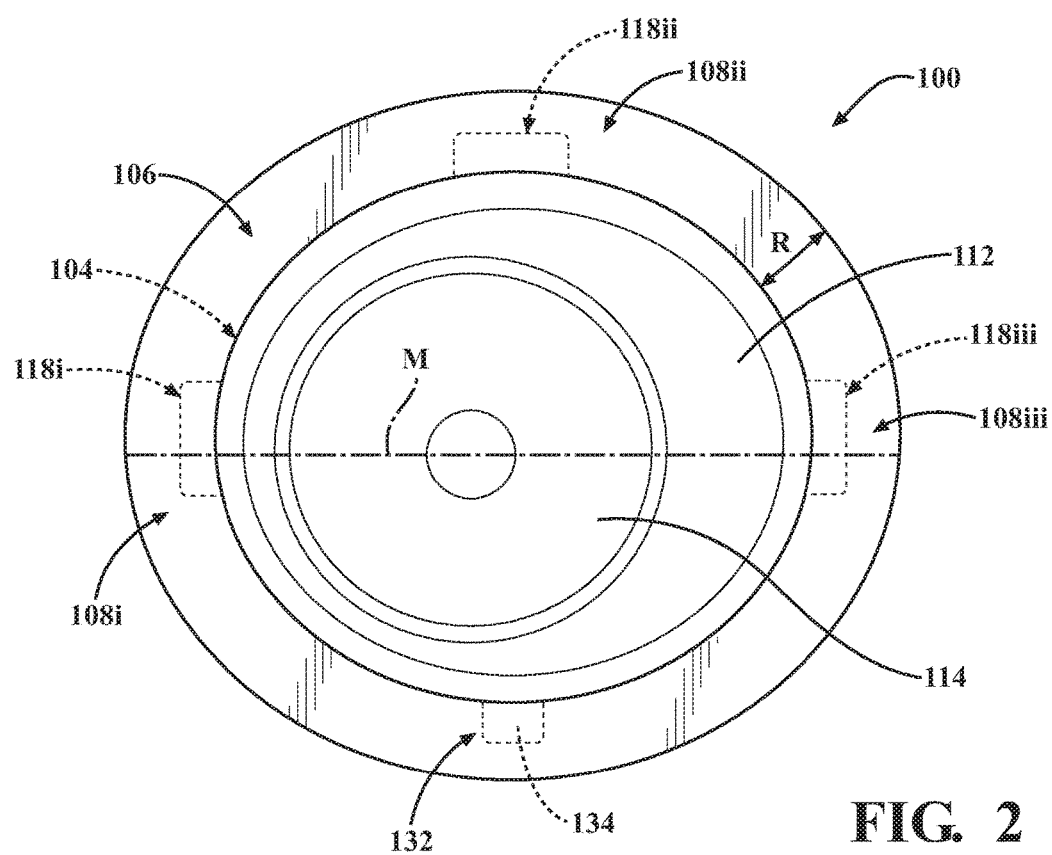
FIG. 2 is a front, plan view of one of the lighting units shown separated from the vehicle.

In the particular embodiment of the disclosure seen throughout the figures, the lighting unit 100 is illustrated as including three identical retainers 108*i*, 108*ii*, 108*iii*. It should be appreciated, however, that the number of retainers 108 may be varied in alternate embodiments without departing from the scope of the present disclosure (e.g., depending upon the particular configuration and/or weight of the lighting unit 100, the configuration of the body 12 of the vehicle 10, etc.). The retainers 108*i*, 108*ii* are separated by approximately 90°, as are the retainers 108*ii*, 108*iii*, whereby the retainers 108*i*, 108*iii* are positioned laterally along (or adjacent to) a midline M (FIG. 2) of the lighting unit 100, and the retainer 108*ii* is offset from the midline M. As seen in FIG. 2, for example, in the illustrated embodiment, the retainer 108*ii* is positioned above the midline M. Embodiments in which the retainer 108*ii* is positioned below the midline M, however, are also contemplated herein. However, to facilitate use of the lighting unit 100 with a variety of vehicles V, it is envisioned that the specific location of the retainers 108*i*, 108*ii*, 108*iii* may be varied in alternate embodiments. For example, embodiments in which each of the retainers 108 is offset from the midline M would not be beyond the scope of the present disclosure.

The retainers 108 may be secured to the lighting unit 100 in any suitable location. For example, in the particular embodiment of the disclosure shown throughout the figures, the retainers 108 are fixedly connected to, and extend rearwardly from, an inner surface 130 (FIG. 3) of the flange 106. Embodiments in which one or more of the retainers 108 are connected to, and extend from, the housing 104, the lens 112, etc., are also contemplated herein. Although shown as being integrally formed with the flange 106 in the particular embodiment of the disclosure shown throughout the figures, it is also envisioned that one or more of the retainers 108 may be formed as a separate, discrete component that may be secured to the lighting unit 100 (e.g., to the flange 106, the housing 104, the lens 112, etc.) in any suitable manner (e.g., via adhesive, welding, etc.).

In certain embodiments of the disclosure, such as that shown throughout the figures, the lighting unit 100 may further include an alignment feature (member) 132. The alignment feature 132 inhibits (if not entirely prevents) improper orientation, positioning, and installation of the lighting unit 100 and is configured for engagement (contact) with a corresponding structure on the body 12 of the vehicle 10, as described in further detail below. To promote proper orientation, positioning, and installation of the lighting unit 100, the alignment feature 132 includes a configuration that differs from that of the retainer(s) 108 such that the lighting unit 100 is configured for connection to the body 12 of the vehicle 10 in a single orientation only to inhibit improper installation of the lighting unit 100, as described in further detail below.

In the particular embodiment of the lighting unit 100 shown throughout the figures, the alignment feature 132 is configured as a generally linear rib 134 that is arranged in a generally vertical orientation. More specifically, the alignment feature 132 is positioned generally opposite to the retainer 108*ii* such that the alignment feature 132 is separated from each of the retainers 108*i*, 108*iii* by approximately 90°. It should be appreciated, however, that the particular configuration and/or position of the alignment feature 132 may be varied in alternate embodiments without departing from the scope of the present disclosure. For example, embodiments in which the alignment feature 132 may be oriented in a generally horizontal orientation are contemplated herein, as are embodiments in which the alignment feature 132 may be non-linear (e.g., sinusoidal) in configuration, as well as embodiments in which the alignment feature 132 may be configured as a detent or as an opening (e.g., an aperture, a channel, etc.) that is configured to receive a corresponding structure extending from the body 12 of the vehicle 10.

Although shown as being connected to, and extending from, the housing 104 in the particular embodiment of the disclosure shown throughout the figures, it should be appreciated that the specific location of the alignment feature 132 may be varied without departing from the scope of the present disclosure. For example, embodiments in which the alignment feature 132 is connected to, and extends from, the inner surface 130 of the flange 106, the lens 112, etc., are also contemplated herein. Although shown as being integrally formed with the lighting unit 100, in alternate embodiments of the disclosure, it is envisioned that the alignment feature 132 may be formed as a separate, discrete component that may be secured to the lighting unit 100 (e.g., to the housing 104, to the flange 106, to the lens 112, etc.) in any suitable manner (e.g., via adhesive, welding, etc.).

Figure 5:
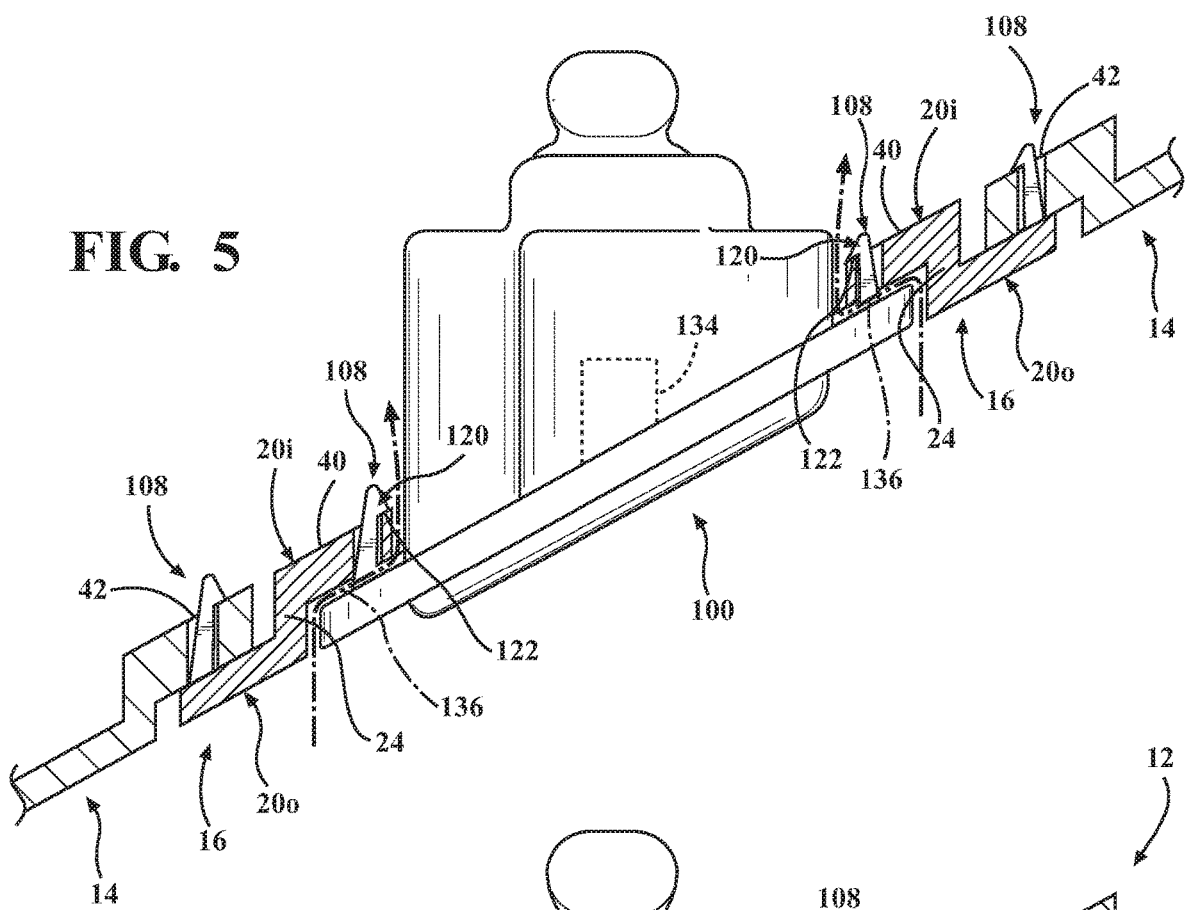
FIG. 5 is a (horizontal) cross-sectional view illustrating connection of the lighting unit to the body of the vehicle according to one method.

The finisher 16 is a component of the body 12 of the vehicle 10 and may constitute a support structure, a decorative (aesthetic) element, a cover, etc. In the particular embodiment of the disclosure shown throughout the figures, the finisher 16 is formed as a separate, discrete structure that is connected to the body 12 of the vehicle 10 (e.g., the bumper 14) via one or more of the retainers 108, as seen in FIG. 5 and described in further detail below. It is envisioned, however, that the finisher 16 may be connected to the body 12 of the vehicle 10 in any suitable manner, such as, for example, via an adhesive, through the use of one or more mechanical fasteners (e.g., screws, bolts, pins, etc.), via welding, via an interference fit (e.g., snap-fit) arrangement, etc. Embodiments in which the finisher 16 is integrally formed with the body 12 (e.g., the bumper 14), however, would not be beyond the scope of the present disclosure and are also contemplated herein.

The finisher 16 includes a body portion 18 defining respective inner and outer extensions 20i, 20o (e.g., flanges 22i, 22o) that are connected by a wall 24 such that the extensions 20i, 20o extend radially outwardly from the wall 24. The inner extension 20i defines a receiving space 26 (FIG. 4) that is configured to removably receive the lighting unit 100 and extends inwardly from the wall 24 such that the inner extension 20i is positioned in non-contacting (e.g., generally parallel) relation to the flange 106 of the lighting unit 100 upon connection of the lighting unit 100 to the finisher 16, as seen in FIG. 5 and described in further detail below. To facilitate removable connection of the lighting unit 100 to the finisher 16, the finisher 16 includes a retention structure 28 that is configured for engagement with the retainer(s) 108. More specifically, in the particular embodiment of the disclosure seen throughout the figures, the retention structure 28 includes a series of openings 30 (e.g., apertures, slits, channels, etc.) that are formed in the inner extension 20i, each of which is defined by a perimeter wall 32. The opening(s) 30 are configured and positioned to removably receive the retainer(s) 108 and are positioned in correspondence therewith. As such, in the particular embodiment of the disclosure seen throughout the figures, the finisher 16 includes three identical openings 30i, 30ii, 30iii (defining perimeter walls 32i, 32ii, 32iii) that are configured to receive the retainers 108i, 108ii, 108iii, respectively. To facilitate receipt of the retainers 108i, 108ii, 108iii, the openings 30i, 30ii, 30iii are separated by approximately 90°, whereby the openings 30i, 30iii are positioned laterally along (or adjacent to) a midline MF of the finisher 16, and the opening 30ii is offset from the midline MF. More specifically, in the illustrated embodiment, the opening 30ii is positioned above the midline MF. Embodiments in which the opening 30ii is positioned below the midline MF, however, are also contemplated herein, as are embodiments in which the specific location of the openings 30i, 30ii, 30iii may be varied to facilitate use with a variety of lighting units 100. For example, embodiments in which each of the openings 30 is offset from the midline MF would not be beyond the scope of the present disclosure.

Although shown as being arranged in a generally horizontal orientation, depending upon the particular configuration and/or position of the retainer(s) 108, it should be appreciated that the orientation of the opening(s) 30 may be varied in alternate embodiments of the disclosure. For example, embodiments in which the opening(s) 30 are arranged in a generally vertical orientation are also contemplated herein, as are embodiments in which the opening(s) 30 are arranged at an angle.

As indicated above, it is envisioned that the number of retainers 108 included on the lighting unit 100 may be varied in alternate embodiments of the disclosure. As such, it is envisioned that the number of openings 30 may also be varied.

In certain embodiments of the disclosure, such as that shown throughout the figures, the finisher 16 may further include an alignment feature (member) 34 that is configured in correspondence with the alignment feature 132 on the lighting unit 100. To promote proper orientation, positioning, and installation of the lighting unit 100, the configuration of the alignment feature 34 differs from that of the opening(s) 30 such that the lighting unit 100 is configured for installation and connection to the finisher 16 in a single orientation only. For example, in the particular embodiment of the disclosure seen throughout the figures, the alignment feature 34 includes a receptacle 36 (e.g., a cutout 38) that is narrower than the opening(s) 30 and is configured to receive the alignment feature 132 (e.g., the rib 134). It should be appreciated, however, that the particular configuration of the alignment feature 34 may be varied in alternate embodiments (e.g., depending upon the particular configuration of the alignment feature 132) without departing from the scope of the present disclosure. For example, embodiments in which the receptacle 36 may be non-linear (e.g., sinusoidal) in configuration are contemplated herein, as are embodiments in which the alignment feature 34 may be configured as a detent (other such projection).

Although shown as being arranged in a generally vertical orientation, depending upon the particular configuration and/or position of the alignment feature 132 on the lighting unit 100, it should be appreciated that the orientation of the alignment feature 34 may be varied in alternate embodiments of the disclosure. For example, embodiments in which the alignment feature 34 is arranged in a generally horizontal orientation are also contemplated herein, as are embodiments in which the alignment feature 34 is arranged at an angle.

With continued reference to FIGS. 1-5, connection of the lighting unit 100 to, and disconnection of the lighting unit 100 from, the vehicle 10 will be discussed. As mentioned above, conventionally, lighting units are installed from a position either underneath the vehicle 10 or from a position behind the bumper 14 in a generally forward direction, as indicated by arrow 1 in FIG. 1, which can be cumbersome and time consuming. The lighting units 100 described herein, however, are configured for connection to the vehicle 10 from a position forward of the vehicle 10 in a generally rearward direction, as indicated by arrow 2 in FIG. 1, thus simplifying both connection and removal of the lighting units 100. For example, due to the generally rearward direction of installation, removal of the bumper 14 from the vehicle 10 is unnecessary during repair and/or replacement of the lighting units 100, as is typically required in the context of known lighting units, which reduces the time and costs associated with both manufacture and ownership of the vehicle 10.

To connect the lighting unit 100 to the body 12 of the vehicle 10, the alignment features 132, 34 respectively included on the lighting unit 100 and the finisher 16 are aligned, and the retainers 108 are inserted into the openings 30 formed in the inner extension 20*i*. More specifically, the rib 134 is inserted into the receptacle 36, and the retainers 108*i*, 108*ii*, 108*iii* are press-fit into the openings 30*i*, 30*ii*, 30*iii*, respectively. Due to the differing configurations of the receptacle 36 and the openings 30, attempts to install the lighting unit 100 improperly will be frustrated, thus promoting (if not ensuring) proper connection of the lighting unit 100 to the finisher 16.

As the retainers 108*i*, 108*ii*, 108*iii* are respectively advanced into the openings 30*i*, 30*ii*, 30*iii*, the bearing wall 124 defined by the finger 120 on each arm 118 is brought into engagement (contact) with the perimeter wall 32*i*, 32*ii*, 32*iii* of the respective openings 30*i*, 30*ii*, 30*iii*. Due to the tapered configuration of the finger 120, contact between the bearing walls 124 and the perimeter walls 32 causes the application of outwardly directed forces F (FIG. 5) to the arms 118 that deflects the arms 118 outwardly (i.e., away from the housing 104 of the lighting unit 100) such that the retainers 108 are moved from the normal position into the biased position. During advancement of the retainers 108*i*, 108*ii*, 108*iii* into the respective openings 30*i*, 30*ii*, 30*iii*, outward deflection of the arms 118*i*, 118*ii*, 118*iii* is facilitated by the tapered configuration of the arms 118 and the fingers 120.

In the normal position (i.e., in the absence of the force F), which is seen in FIG. 5, for example, the arm 118 of each retainer 108 is spaced a distance D from the housing 104 of the lighting unit. In the biased position, however, due to the outward deflection resulting from contact with the finisher 16, the distance D between the arm 118 of each retainer 108 and the housing 104 is increased, and an internal biasing force is created in each retainer 108 that is directed inwardly in opposition to the force F.

Upon complete advancement of the retainers 108 into the openings 30, the biasing force in the arms 118 moves the arms 118 inwardly (i.e., towards the housing 104 of the lighting unit 100) such that the fingers 120 of each arm 118 are positioned rearwardly of (behind) the inner extension 20*i* of the finisher 16. When so positioned, the shoulder 122 on the finger 120 of each arm 118 is positioned in engagement (contact) with an inner (rear) surface 40 of the inner extension 20*i* to thereby secure the retainers 108, and, thus, the lighting unit 100, to the finisher 16.

Upon connection of the lighting unit 100 to the body 12 of the vehicle 10 (e.g., to the finisher 16), as seen in FIG. 5, the flange 106 overlaps the inner extension 20*i* of the finisher 16 such that the inner extension 20*i* is positioned rearwardly of the flange 106 so as to reduce (if not entirely eliminate) the "see-through" condition that is common to known lighting units. More specifically, the overlap between the flange 106 and the inner extension 20*i* prevents the passage of light between the lighting unit 100 and the body 12 of the vehicle 10 to thereby improve the overall appearance of the lighting unit 100. Moreover, the flange 106 and the retainer(s) 108 are configured to define a tortuous (e.g., non-linear) channel 136 (or other such gap) that extends between the lighting unit 100 and the finisher 16 to allow for air flow about the lighting unit 100 (e.g., to facilitate the transfer of heat away from, and cooling of, the lighting unit 100). More specifically, the flange 106 is configured to avoid contact with the finisher 16 (e.g., with the wall 24 and/or the outer extension 20*o*), and the retainer(s) 108 are configured to separate the flange 106 from the inner extension 20*i* such that, in the illustrated embodiment, the channel 136 defines a width that lies substantially within the range of approximately 1 mm to approximately 3 mm and is generally S-shaped in configuration. A channel 136 defining a width outside of the range of approximately 1 mm to approximately 3 mm, however, would not be beyond the scope of the present disclosure. As can be appreciated through reference to FIG. 5, for example, in those areas of the lighting unit 100 that are devoid of the retainer(s) 108, air is allowed to flow unobstructed between the lighting unit 100 and the body 12 of the vehicle 10 (e.g., the finisher 16).

In various embodiments of the disclosure, it is envisioned that the particular configuration of the inner extension 20*i*, the configuration of the flange 106 (e.g., the radial dimension R (FIG. 2)), and/or the configuration of the retainer(s) 108 (e.g., the length L (FIG. 3) of the arm 118) may be altered to adjust airflow about the lighting unit 100 as necessary or desired. For example, it is envisioned that the radial dimension R of the flange 106 and/or the length L of the arm 118 may be increased or decreased. Additionally, or alternatively, it is envisioned that the configuration of the flange 106 and/or the inner extension 20*i* may be altered such that the flange 106 and the inner extension 20*i* extend in non-parallel relation. To further adjust airflow about the lighting unit 100, it is envisioned that the flange 106 and/or the inner extension 20*i* may include one or more surface irregularities, such as channels, projections, fins, etc. (e.g., to facilitate the circulation of air about the lighting unit 100).

To remove the lighting unit(s) 100 from the vehicle 10, the process described above is reversed. More specifically, the arms 118 are deflected outwardly via (manual) application of the force F, whereby the shoulder 122 on the finger 120 of each arm 118 is disengaged from (moved out of contact with) the inner (rear) surface 40 of the inner extension 20*i* to allow for withdrawal of the fingers 120 from the openings 30 in the inner extension 20*i* of the finisher 16, and, thus, disconnection of the lighting unit from the finisher 16.

As mentioned above, the retainer(s) 108 described herein eliminate the need for the bolts (or other such fasteners) that are conventionally utilized to connect lighting units to vehicles. The retainer(s) 108 thus reduce the number of parts and steps required for assembly, and, thus, the complexity thereof, thereby reducing the overall time and associated costs required for installation, and increasing the quality and/or reliability of the installation.

Although the arms 118 are described as being deflected outwardly during insertion of the retainers 108 into the openings 30 in the inner extension 20*i* of the finisher 16 in the foregoing discussion, as mentioned above, in alternate embodiments of the disclosure, it is envisioned that the fingers 120 may instead extend outwardly from the arms 118. As such, embodiments are also envisioned herein in which the arms 118 may be deflected inwardly during insertion of the retainers 108 into the openings 30 and returned to the normal position via outward movement.

As indicated above, in the particular implementation illustrated in FIG. 5, the finisher 16 is connected to the bumper 14 using one or more of the retainers 108, which are inserted into corresponding openings 42 formed in the bumper 14 in a manner identical to that discussed with respect to the connection of the lighting unit 100 to the finisher 16. In the particular implementation seen in FIG. 5, the retainer(s) 108 are devoid of the base portion 128 (e.g., to reduce (or entirely eliminate) separation (gapping) between the bumper 14 and the finisher 16). Implementations in which the retainer(s) 108 used to connect the bumper 14 to the finisher 16 include the aforedescribed base portion 128 would not be beyond the scope of the present disclosure, however.

Figure 6:
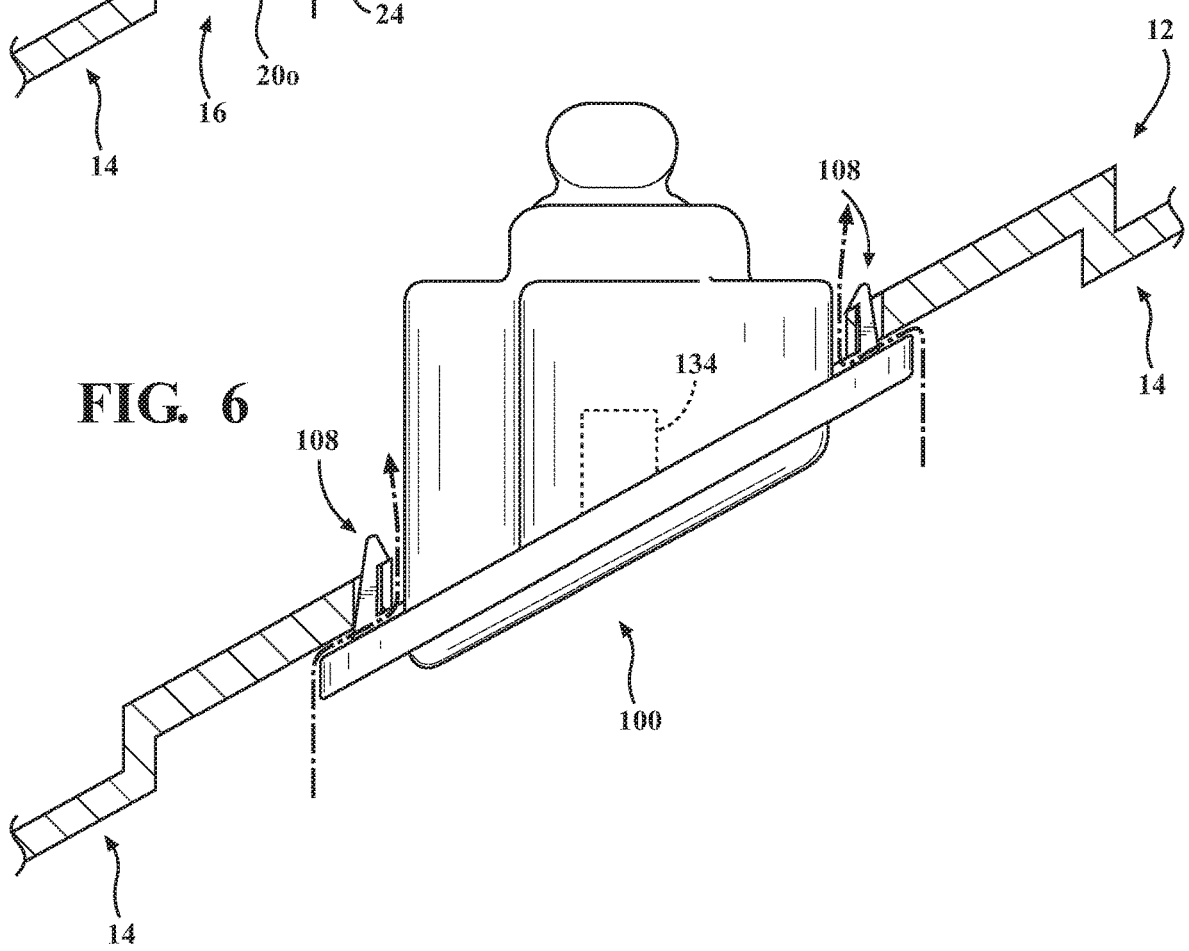
FIG. 6 is a (horizontal) cross-sectional view illustrating connection of the lighting unit to the body of the vehicle according to an alternate method.

As seen in FIG. 6, embodiments of the disclosure are also envisioned herein in which the finisher 16 may be omitted. In such embodiments, the lighting unit(s) 100 may be connected directly to the body 12 of the vehicle 10 (e.g., to the bumper 14). In such embodiments, the retainer(s) 108 on the lighting unit 100 may be inserted into the openings 42 formed in the bumper 14 in the aforedescribed manner.

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
   a bumper;
   a finisher mechanically connected to the bumper, the finisher comprising:
   a first extension extending in a first direction;
   a second extension extending in a second direction, the second extension being configured for mechanical connection to the bumper; and
   a wall extending between and interconnecting the first extension and the second extension; and
   a lighting unit mechanically connected to the first extension such that the lighting unit is indirectly connected to the bumper via the finisher, the lighting unit comprising:
   a housing;
   a radial flange extending outwardly of the housing; and
   at least one retainer fixedly connected to the radial flange such that the at least one retainer extends rearwardly towards the finisher during installation to allow for removable connection of the lighting unit to the finisher from a location forward of the vehicle, the at least one retainer being configured for insertion into a corresponding opening formed in the first extension and including a resilient material facilitating deflection of the at least one retainer during installation and removal of the lighting unit.

2. The vehicle of claim 1, wherein the housing, the radial flange, and the at least one retainer are integrally formed.

3. The vehicle of claim 1, wherein the at least one retainer is configured as a clip.

4. The vehicle of claim 1, wherein the at least one retainer is repositionable between a normal position, in which the at least one retainer is spaced a first distance from the housing, and a biased position, in which the at least one retainer is spaced a second distance from the housing.

5. The vehicle of claim 4, wherein the at least one retainer is configured such that the second distance is greater than the first distance.

6. The vehicle of claim 1, wherein the at least one retainer includes a plurality of retainers.

7. The vehicle of claim 6, wherein the plurality of retainers includes a first retainer, a second retainer, and a third retainer.

8. The vehicle of claim 7, wherein the second retainer is separated from the first retainer by approximately 90°, and the third retainer is separated from the second retainer by approximately 90°.

9. The vehicle of claim 8, further including an alignment feature configured for insertion into a corresponding receptacle defined by the finisher.

10. The vehicle of claim 9, wherein the alignment feature includes a configuration different from those of the retainers to inhibit improper installation of the lighting unit.

11. The vehicle of claim 10, wherein the alignment feature is separated from each of the first retainer and the third retainer by approximately 90°.

12. A vehicle comprising:
   a body including a finisher defining a receiving space and including at least one opening; and a lighting unit configured for removable insertion into the receiving space, the lighting unit including:

a housing;

a radial flange extending outwardly from the housing; and at least one retainer fixedly connected to the radial flange and configured to facilitate removable connection of the lighting unit to the finisher from a location forward of the vehicle, the at least one retainer being configured for insertion into the at least one opening in the finisher and being resiliently deflectable between an initial position and a deflected position during installation and removal of the lighting unit, wherein the at least one retainer is configured for engagement with the finisher such that a channel is defined between the lighting unit and the finisher upon installation of the lighting unit to facilitate air flow about the lighting unit.

13. The vehicle of claim 12, wherein the finisher includes an extension that extends in generally parallel relation to the radial flange such that the extension is positioned rearwardly of the radial flange, the channel extending between the extension and the radial flange.

14. The vehicle of claim 13, wherein the finisher and the radial flange are configured to prevent contact between the finisher and the housing of the lighting unit.

15. The vehicle of claim 14, wherein the finisher further includes a receptacle configured to receive an alignment feature on the lighting unit, the alignment feature including a configuration different from that of the at least one retainer to inhibit improper installation of the lighting unit.

16. A method of connecting a lighting unit to a vehicle, the method comprising:

positioning the lighting unit such that a retainer extending fixedly and rearwardly from a radial flange of the lighting unit is generally aligned with a corresponding opening in a body of the vehicle; and from a location forward of the vehicle, inserting the retainer into the corresponding opening in the body of the vehicle such that the retainer is resiliently deflected from an initial position to a deflected position to removably secure the lighting unit to the body of the vehicle, wherein inserting the retainer into the corresponding opening in the body of the vehicle includes defining a channel between the lighting unit and the body of the vehicle to facilitate air flow about the lighting unit.

17. The method of claim 16, wherein inserting the retainer into the corresponding opening in the body of the vehicle includes inserting a first retainer into a first opening in the body of the vehicle, inserting a second retainer into a second opening in the body of the vehicle, and inserting a third retainer into a third opening in the body of the vehicle, the second retainer being separated from the first retainer by approximately 90°, and the third retainer being separated from the second retainer by approximately 90°.

18. The vehicle of claim 1, wherein the finisher, the lighting unit, and the at least one retainer are configured such that a channel is defined between the lighting unit and the finisher upon installation of the lighting unit to facilitate air flow about the lighting unit.

19. The vehicle of claim 1, wherein the finisher is configured such that the first extension and the second extension are offset along a length of the vehicle.

20. The vehicle of claim 19, wherein the finisher includes a generally S-shaped configuration.

* * * * *